C. B. DALZELL.
STERILIZING TANK.
APPLICATION FILED JAN. 12, 1912.
1,105,187.
Patented July 28, 1914.
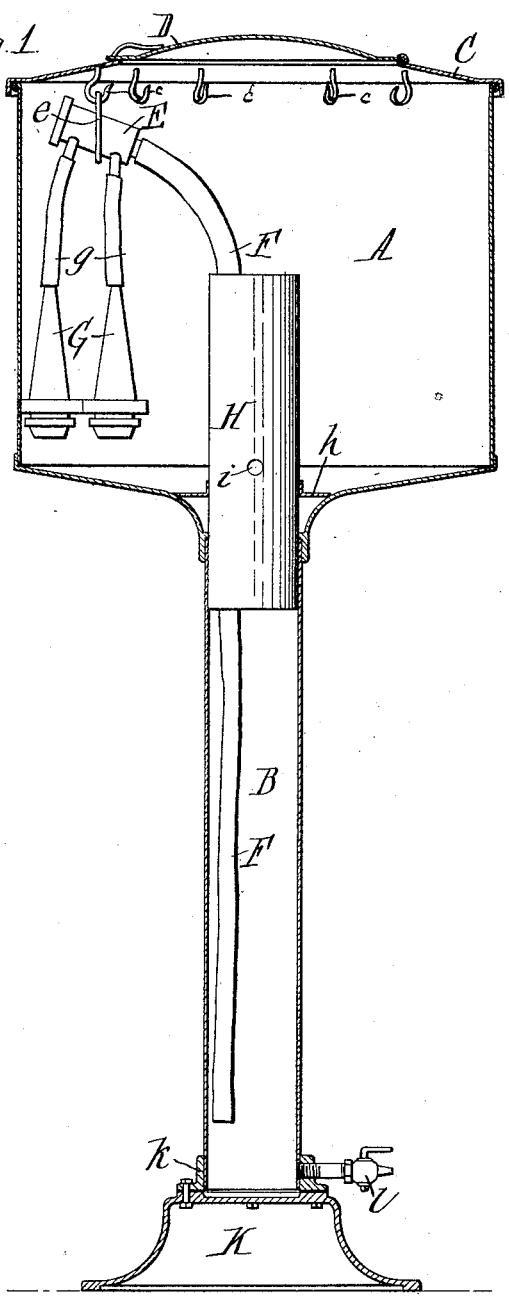
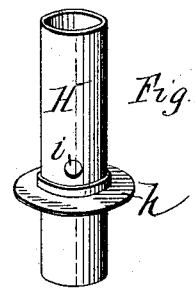
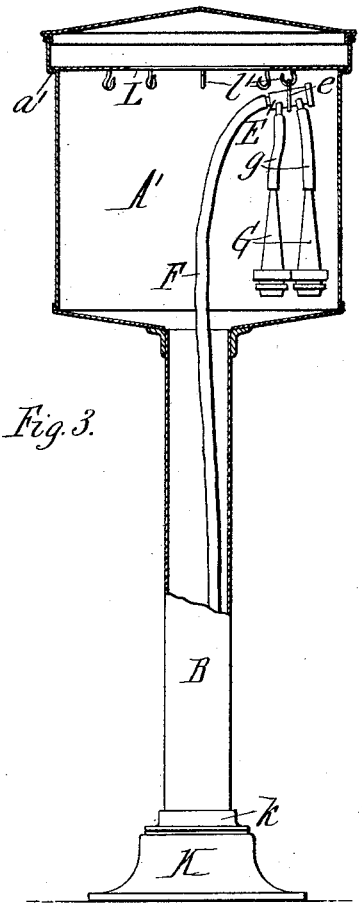
Witnesses:
Inventor
Charles B. Dalzell
By Wilhelm, Parker & Hair
Attorneys.

UNITED STATES PATENT OFFICE.

CHARLES B. DALZELL, OF LITTLE FALLS, NEW YORK, ASSIGNOR TO D. H. BURRELL & COMPANY, OF LITTLE FALLS, NEW YORK.

STERILIZING-TANK.

1,105,187.  Specification of Letters Patent.  Patented July 28, 1914.

Application filed January 12, 1912. Serial No. 670,857.

*To all whom it may concern:*

Be it known that I, CHARLES B. DALZELL, a citizen of the United States, residing at Little Falls, in the county of Herkimer and State of New York, have invented a new and useful Improvement in Sterilizing-Tanks, of which the following is a specification.

This invention relates to a tank or receptacle for containing an antiseptic or sterilizing solution in which parts of milking machines and similar articles can be kept immersed when not in use.

One of the principal objects which are sought to be accomplished by the use of milking machines is to produce milk of low bacterial content. It has been found that for the accomplishment of this result it is of great importance that the rubber tubes and connecting parts, such as teat cups, mouth pieces and connectors, when not in use, should be kept immersed in an antiseptic solution in order to destroy the bacteria or germs in the same.

The object of this invention is to produce a tank or receptacle which is suitable for containing such a solution or liquid and which is so constructed that the tubes and other parts can be conveniently suspended in the same in such a position that the air will freely escape and the tubes and other parts will become filled with the liquid.

As illustrating one type or style of tubes and fittings for which this tank is designed, reference is made to Patent No. 979,174, Dec. 20, 1910, Lane, which shows a main rubber tube extending from the milk vessel to a connector or manifold fitting and branch rubber tubes extending from this connector to the teat cups.

In the accompanying drawings: Figure 1 is a sectional elevation of the preferred construction of this improved tank. Fig. 2 is a detached perspective view of the guide tube removed from the tank. Fig. 3 is a partly sectional elevation of a modified construction of the tank.

Like reference characters refer to like parts in the several figures.

Referring to the construction of the tank represented in Figs. 1 and 2, the tank comprises an upper large portion A which is designed to receive the teat cups, branch tubes, connectors and the portions of the main tubes which are adjacent to the connector, and a lower contracted portion B which is designed to receive the remaining portions of the main tubes. The lower portion constitutes an upright hollow column, preferably of circular cross section, although other cross sections may be used, upon which the upper portion, also circular, or of corresponding cross section, is supported.

The upper portion of the tank is provided with a removable cover comprising an outer annular portion C which rests loosely upon the tank and an inner central portion D which is hinged to the annular portion so that it can be swung up or down. The annular portion C is provided on its under side near its inner edge with hooks $c$ from which the tubes are suspended by means of the loops with which the connectors are usually provided for attachment to the bails of the pulsators.

E represents the connectors, $e$ their loops, F the main milk tubes, G the teat cups, and $g$ the branch tubes. When the tubes have been so suspended in the tank the branch pipes and teat cups hang down from the connector in the upper enlarged part A of the tank, and the main tubes extend downwardly into the lower contracted part of the tank.

For the purpose of facilitating the introduction of the main tubes into the lower contracted part of the tank, a guide tube or extension H is provided which is preferably removable and arranged with its lower portion in the lower portion B of the tank. This guide tube extends into the upper portion A to such a distance from the cover that the main rubber tubes can be conveniently introduced into this guide tube and through the latter into the lower portion B of the tank. This guide tube may be supported in any suitable manner, for instance, on the bottom of the upper portion A by a collar $h$ secured to the tube and provided with openings $i$ for the passage of the liquid. When the cover and the guide tube have been removed, the interior of the tank is freely accessible for cleaning.

The lower end of the lower portion B of the tank is closed by a foot, base or pedestal K which is secured to a base flange $k$ on the portion B. A drain cock $l$ is provided at the bottom of the tank through which the liquid may be withdrawn wholly or in part, as desired.

In the modified construction represented in Fig. 3, the upper portion A' of the tank is provided near its top with an annular shoulder or ledge a' upon which rests loosely a spider or plate L which is provided with hooks l' to which the connectors are attached.

In the improved tank herein described and illustrated, the tubes are so suspended and arranged that air is not caught or imprisoned in any part of the same and the sterilizing or antiseptic liquid, which may be of any suitable character or composition, completely fills every part of the tubes and branch tubes and comes in contact with every part of the inner and outer surfaces thereof, thereby securing a complete sterilization of these parts. The main tubes and the branch tubes hang down from the connector and the air escapes upwardly through the connector which is provided with a longitudinal air passage through it, as described in the patent above referred to.

The construction of the tank represented in Fig. 1 has many desirable features, among them that the operator can readily introduce and remove the tubes without bringing his hands in contact with the liquid.

The contracted lower portion of the tank serves to hold the main tubes closely in position, prevents the different tubes from becoming curled and from interfering with each other, reduces the weight, bulk and cost of the apparatus, and reduces the volume of liquid contained therein.

I claim as my invention:

1. A sterilizing tank comprising a hollow column and an enlarged top portion communicating therewith and comprising a bottom which extends outwardly from the upper portion of said column, a peripheral wall extending upwardly from said bottom, a cover resting on said peripheral wall, and devices in said top portion for suspending tubular articles within said top portion and hollow column.

2. A sterilizing tank comprising a hollow column and an enlarged top portion communicating therewith and comprising a bottom which extends outwardly from the upper portion of said column, a peripheral wall extending upwardly from said bottom, and a tubular guide forming an upward continuation of said column and terminating within said top portion.

3. A sterilizing tank comprising a hollow column and an enlarged top portion communicating therewith and comprising a bottom which extends outwardly from the upper portion of said column, a peripheral wall extending upwardly from said bottom, and a tubular guide forming an upward continuation of said column and removably arranged upon the same within said top portion.

4. A sterilizing tank comprising an upper enlarged portion, a lower contracted portion, and a cover consisting of an outer annular portion provided with means for suspending the articles to be immersed in the liquid, and an inner movable portion, substantially as set forth.

Witness my hand, this 6th day of January, 1912.

CHARLES B. DALZELL.

Witnesses:
W. T. WOLFENDEN,
GRIFFITH PRICHARD.

Copies of this patent may be obtained for five cents each, by addressing the "Commissioner of Patents, Washington, D. C."